(12) United States Patent
LeBlanc

(10) Patent No.: US 6,390,553 B1
(45) Date of Patent: May 21, 2002

(54) BACK-SUPPORT DEVICE

(76) Inventor: Andrew J. LeBlanc, 129 Jewett St., Georgetown, MA (US) 01833

( * ) Notice: Subject to any disclaimer, the term of this patent is extended or adjusted under 35 U.S.C. 154(b) by 0 days.

(21) Appl. No.: 09/686,573

(22) Filed: Oct. 11, 2000

(51) Int. Cl.⁷ .................................................. A47C 4/54
(52) U.S. Cl. ............................ 297/284.6; 297/DIG. 8
(58) Field of Search ........................... 297/284.6, 284.4, 297/DIG. 3, 284.1, 452.41, DIG. 8

(56) References Cited

U.S. PATENT DOCUMENTS

| | | | |
|---|---|---|---|
| 3,326,601 A | * | 6/1967 | Vanderbilt et al. |
| 4,148,522 A | | 4/1979 | Sakurada et al. |
| 4,182,533 A | | 1/1980 | Arndt et al. |
| 4,296,965 A | | 10/1981 | Sakurada et al. |
| 4,807,931 A | | 2/1989 | Ishida et al. |
| 4,840,425 A | | 6/1989 | Noble |
| 4,895,352 A | * | 1/1990 | Stumpf |
| 5,189,747 A | | 3/1993 | Mundy et al. |
| 5,190,348 A | * | 3/1993 | Colasanti |
| 5,433,506 A | * | 7/1995 | Jensen |
| 5,553,917 A | | 9/1996 | Arndt al. |
| 5,558,398 A | * | 9/1996 | Santos |
| 5,562,324 A | * | 10/1996 | Massara et al. |
| 5,868,466 A | | 2/1999 | Massara et al. |
| 5,893,609 A | | 4/1999 | Schmidt |
| 5,975,629 A | | 11/1999 | Lorbiecki |
| 5,975,634 A | | 11/1999 | Knoblock et al. |
| 6,036,265 A | | 3/2000 | Cosentino |
| 6,079,785 A | | 6/2000 | Peterson et al. |
| 6,092,871 A | | 7/2000 | Beaulieu |

* cited by examiner

Primary Examiner—Milton Nelson, Jr.
(74) Attorney, Agent, or Firm—Thomas L. Bohan; Patricia M. Mathers

(57) ABSTRACT

Back-support device providing for expansion of a surface contour of a backrest of a seat, bed, lounge, or other type of body support device. The device includes a back-support that is arranged in the backrest and is made of a pleated fabric. A line of top-stitching is stitched through each fold that forms the pleats. An expandable device such as an air bladder is embedded in the backrest and the back-support device is arranged in the backrest between the air bladder and an occupant of the backrest. The pleats of the back-support device expand outwardly from the backrest, so that the back-support device presses against the back of the occupant, in response to pressure applied by the air bladder. The configuration of the pleats allows the back-support device to readily adapt to the particular contour of the occupant.

5 Claims, 3 Drawing Sheets

BACK-SUPPORT DEVICE

BACKGROUND OF THE INVENTION

1. Field of the Invention

The present invention relates to the field of back supports. More particularly, the present invention relates to back supports that support a person's lumbar spine and associated muscle groups. More particularly still, the present invention relates to such back supports that are pneumatic and embedded in upholstered seat backs.

2. Description of Related Art

Many previous inventions have been directed to the support of the lumbar spine. One class of these involves the use of one or more fluid-filled bladders (i.e., fluid cells) that are placed beneath the fabric of a backrest. Examples of this class are disclosed in Schmidt (U.S. Pat. No. 5,893,609; 1999), which discloses an inflatable lumbar support system that includes an inflatable air cell coupled to a motorized pump, and Ishida et al. (U.S. Pat. No. 4,807,931; 1989), which discloses a lumbar support system very similar to that of Schmidt except for the substitution of a hand-operated pump for the motorized pump. The inflatable cell that supports the lumbar region in the systems according to Schmidt and Ishida et al., and virtually all other known inflatable-cell lumbar support systems, is typically constructed as a simple pillow-like device that, when inflated, has a maximum thickness dimension in the center of the device that gradually and evenly slopes to a minimum thickness at the edges of the device. As a result, the conventional lumbar-support systems of the types disclosed by Schmidt and Ishida et al. fail to constrain the expansion or inflation of the inflatable device to only the lumbar-supporting surface contour of the backrest, and/or fail to provide sufficiently pronounced change in contour to provide adequate and comfortable differential pressure needed in the lumbar region.

Certain inventions within the expandable-fluid-cell class directed to overcoming the above-noted limitation have attempted to provide systems that produce the desired degree of change in the back-support topology that is needed for effective lumbar relief. Among these are Noble (U.S. Pat. No. 4,840,425; 1989) and Lorbiecki (U.S. Pat. No. 5,975,629; 1999). The support systems disclosed therein provide multiple inflatable cells that are small relative to the area of the seat and of the lumbar region of a seat occupant. Consequently, the ability of the inflatable cells to extend outward into the lumbar region of the the seat occupant's back is accordingly small and fails to adequately focus the expansion of the seat backrest on the lumbar region to provide the needed relief and comfort. By "focus" is meant providing for a pronounced or abrupt change in the surface contour of the backrest and restricting this change to a pre-defined particular area.

Another class of existing lumbar-support systems uses rotatable cams or rods to displace a portion of a seat back. One such system is that of Beaulieu (U.S. Pat. No. 6,092,871; 2000), which teaches a lumbar support system embedded in the upright portion of an office chair. The Beaulieu support includes an arcuate lumbar plate, the degree of convexity of which is varied by operating an underlying swing-arm and spring assembly. Just as with the fluid-cell class of supports, the mechanically extendable system of Beaulieu produces a smooth, relatively gradual and continuous change in the surface contour of the backrest. A more pronounced transition (i.e. discrete jump) from one area to an adjacent area is not possible. This class of lumbar support systems, while using alternative expansion means to those of the fluid-cell class of support systems, likewise does not adequately focus the expansion of the seat backrest in the lumbar region.

What is needed therefore is device that provides pronounced expansion of the backrest in the region corresponding to the lumbar region of the person using the backrest. What is further needed is such an device that allows for relatively abrupt changes in the surface contour of a lumbar support area of a backrest. Finally, what is needed is such device that can be built into the backrest of a traditional seat.

SUMMARY OF THE INVENTION

It is an object of the present invention to provide a device in a backrest for the expansion of a back-support that provides an improved adaptability of a back-support to the body contour of an occupant. It is a further object of the present invention to provide such a device that will provide an abrupt change in surface contour of the backrest in a particularly defined area of the backrest. It is a further object to provide such a device for the expansion of a back-support surface in the lumbar region.

The objects are achieved by providing a back-support device according to the present invention that comprises an accordion-pleated section of material that is positioned on the backrest between a conventional expansion or inflation means that is embedded in the backrest and the back of an occupant of the backrest. The backrest may be the backrest, for example, of an upholstered chair or automobile seat, a lounge, or a bed or other type of support devices for a body and any subsequent references herein to a "seat" also include these support devices. The back-support device is constructed as an accordion section comprising multiple pleats that are formed by offset or overlapping folds of a fabric. In one embodiment, the folds extend in a direction transverse to the vertical axis of the backrest, so as to form a cascade of pleats that extends from a top edge of the back-support device to a bottom edge. In an alternative embodiment, the folds extend in a direction parallel to the vertical axis of the backrest. Depending on the particular application of the device according to the present invention, it is possible to form an accordion-pleated backrest support wherein the folds extend in a direction that is diagonal or at some other angle relative to the vertical axis of the backrest. The direction of the folds is not critical to the present invention. Rather, it is the plurality of pleats in the fabric of the back-support device according to the present invention that provides a back-support that is highly variable and, thus, adaptable to the body contour of the occupant and consequently provides a greater particularly localized distention of the back-support device than does the prior art.

The fabric may be from any of a range of materials, including but not limited to leather, natural fibers, synthetic material, woven or non-woven material, and the like. The back-support device is attached along its sides to the backrest, and the sides, the top edge and the bottom edge together define the limits of the expandable (distendable) area. The "outer face" of the back-support device faces outward toward the occupant, and the "inner face" of the section faces inward toward the expansion means. In one embodiment, particularly if the fabric used is leather, each pleat is stitched with a top-stitch that runs along the pleat near the edge of the fold. In this manner, top-stitching placed near a first fold, for example, is visible on the face of the back-support device, whereas the top-stitching near one or two folds respectively adjacent to the first fold is visible on the back of the back-support device, i.e., the side facing the expansion means of the fabric. The pleats of the back-support device are expandable from a non-expanded, relatively flat condition outward away from the backrest and toward an occupant's back, in response to pressure applied by the expansion means, and then fold back again to the non-expanded condition when the expansion means retracts. The expansion of the backrest is thereby confined to only the area defined by the back-support device and, because of the configuration of the pleats, the change in surface contour of the backrest is very pronounced or abrupt in the inflated or expanded area, rather than even and gradual, as is the case with conventional lumbar-support devices.

As stated above, the back-support device is used in conjunction with an expansion means. The expansion means is not limited to any particular type; the necessary quality of it merely being that it move the back-support device towards a person's back. The present invention will have increased utility as new expansion means are devised.

DETAILED DESCRIPTION OF THE PREFERRED EMBODIMENT

The description of a Preferred Embodiment of the present invention is set forth below, with reference to the drawings. This description is by way of example and is not meant to limit the scope of the present invention.

Figure 1:
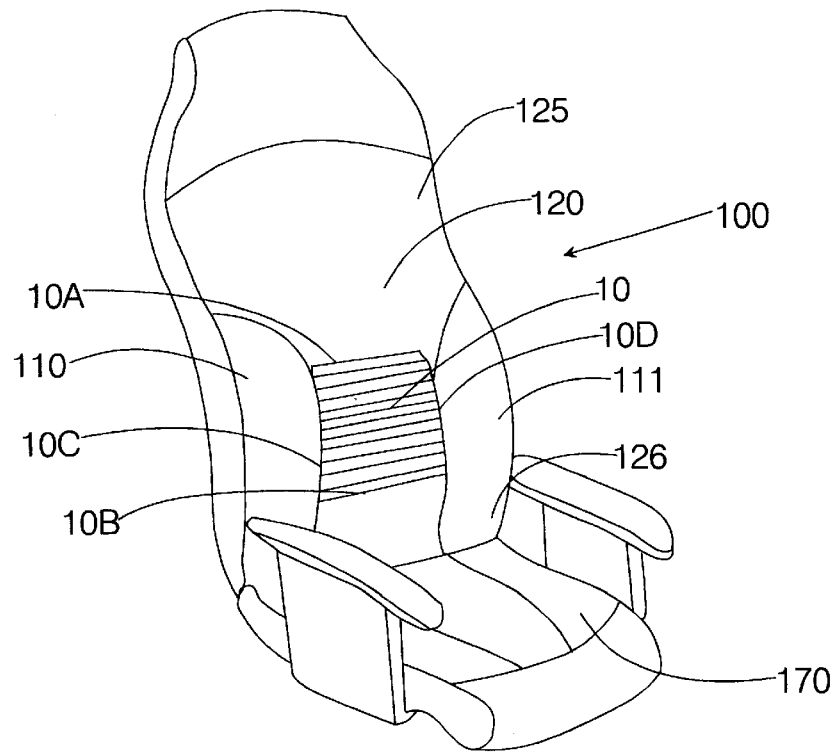
FIG. 1 shows the back-support device of the present invention sewn into the backrest of a particular type of seat.

FIG. 1 shows a back support 10 of the Preferred Embodiment according to the present invention in a backrest 120 of a seat 100. The back-support 10 is sewn into the backrest 120 at a location vertically intermediate between an upper backrest 125 and a lower backrest 126. A fixed left lateral support 110 and a fixed right lateral support 111 abut the respective left and right sides of the back-support 10. Attached to the backrest 120 is a seat portion 170. An expansion means 6, which in the Preferred Embodiment is an air bladder, is arranged beneath the back-support 10 in the backrest 120. The expansion means 6 can be coupled to an inflation device 6A, such as a motorized pump, or be mechanically expandable or inflatable. When the expansion means 6 is caused to expand, the back-support 10 is pushed outward from the backrest 120, conforming to and pressing against the back of an occupant of the backrest, with particular force applied to the occupant's lumbar region.

Figure 2:
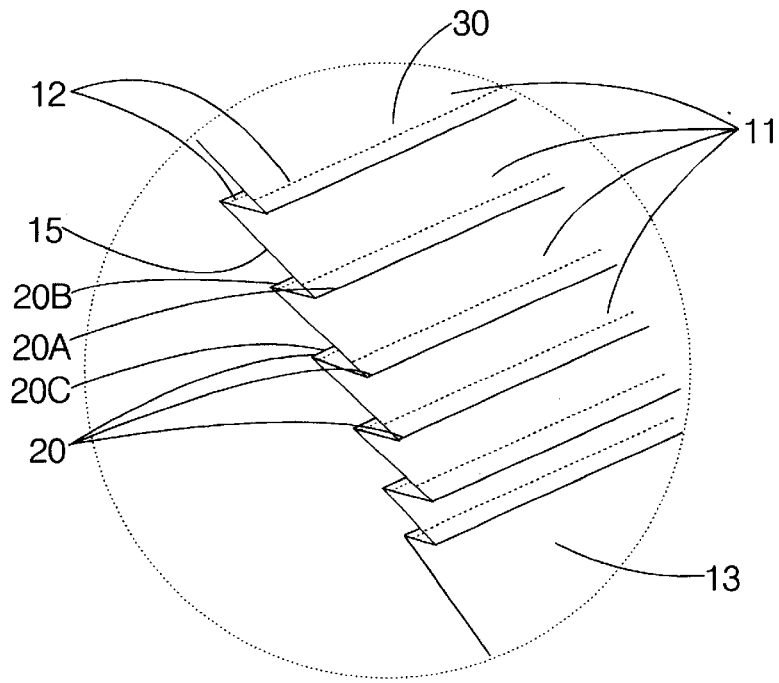
FIG. 2 shows a close-up perspective of the Preferred Embodiment of the back-support device of the present invention including the top stitching on the face and back pleats that is part of the Embodiment.

FIG. 2 shows a partial detailed view of the back-support 10, which comprises a plurality of pleats 11. Each one of the pleats 11 is formed by one or two folds 20 of a fabric 30, whereby, in the illustrated Preferred Embodiment, the folds 20 extend in a direction that is transverse to a vertical axis of the backrest 10. Enough folds 20 are arranged in the fabric 30 to form a cascade of pleats 11, one beneath the other, that cascade extending from an upper edge 10A of the back-support 10 to a lower edge 10B. In a Preferred Embodiment, in which the fabric used for the back-support 10 is leather or some other thick or relatively stiff material, a top-stitching 12 is stitched into each fold 20. As can be seen in FIG. 2, a first fold 20A has the top-stitching 12 on an outer face 13 of the back-support 10, whereas the two respective adjacent folds 20B and 20C have the top-stitching 12 on an inner face 15 of the back-support 10. The outer face 13 is the side that faces outward from the backrest, toward the back of an occupant. The inner face 15 is the side of the back-support 10 that faces inward toward the expansion or inflation means.

Figure 3:
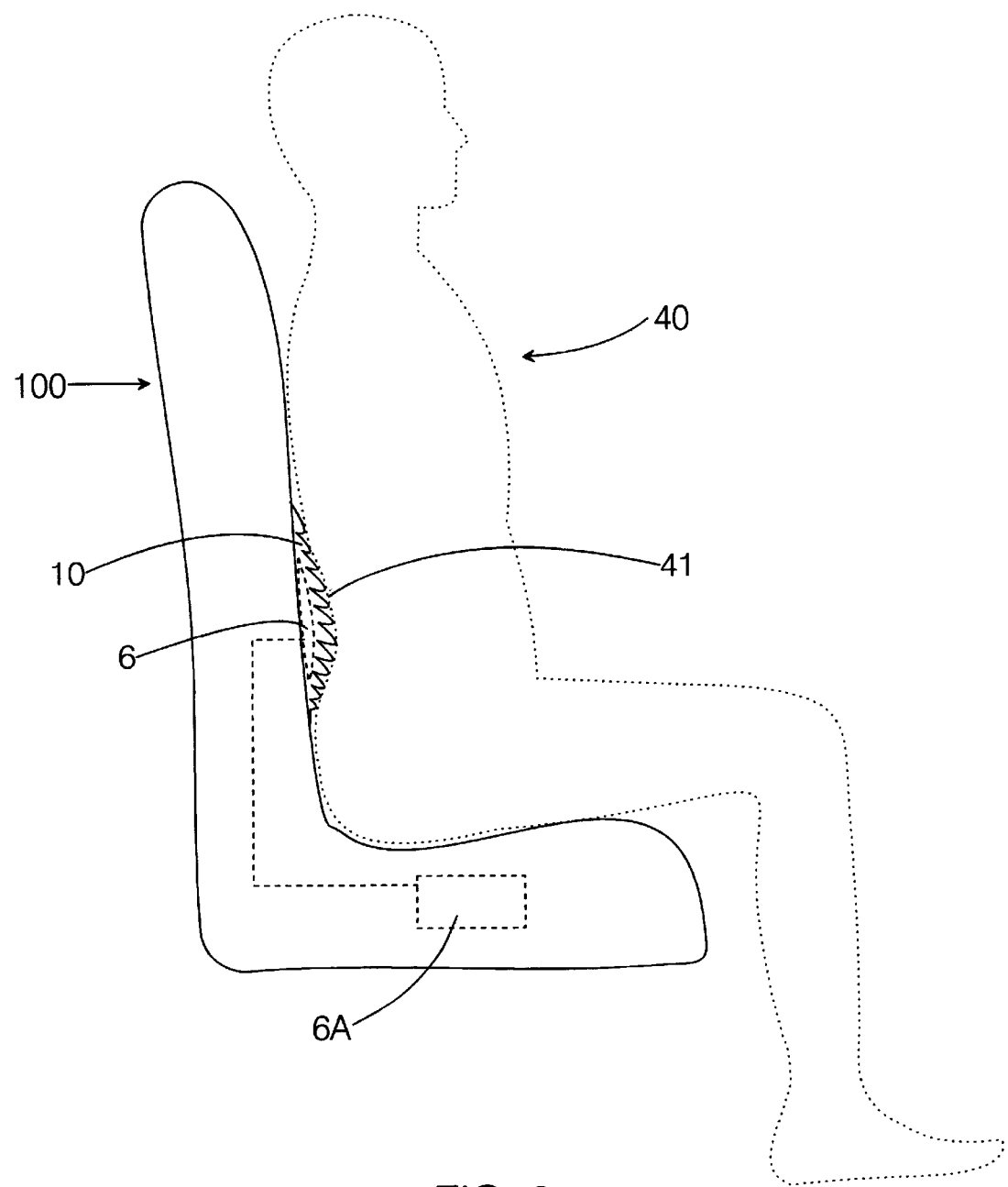
FIG. 3 is a perspective view of an inflated back-support device of the present invention, in a seat with an occupant shown in phantom.
Figure 4:
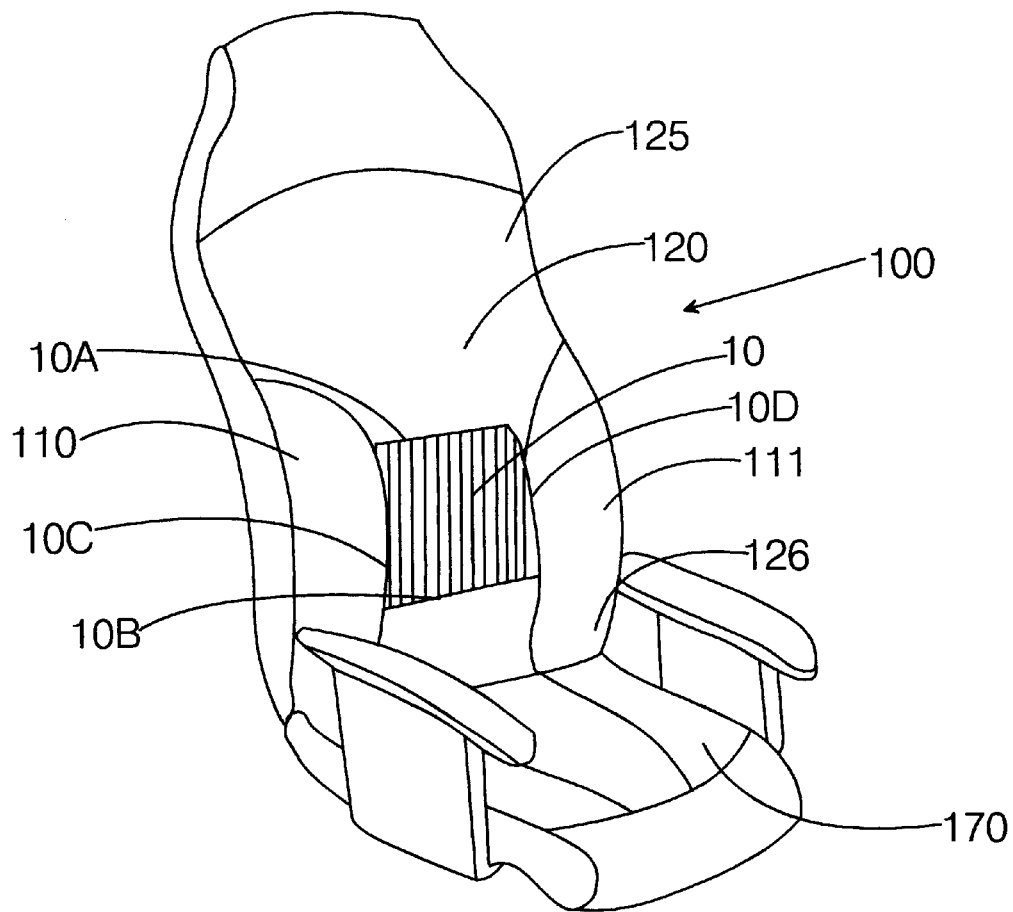
FIG. 4 shows an alternative embodiment of the back-support of the present invention in which the folds run in a vertical direction.

FIG. 3 is a perspective view of the backrest 10, showing an inflated or expanded back-support 10. An occupant 40 of the seat 100 is shown in phantom. As can be seen, the occupant 40 has a lumbar-region contour 41 that is irregularly curved with respect to the curvature of the upper part of the curve and the curvature of the lower part of the curve of the lumbar region. As can also be seen in FIG. 3, the pleats 11 of the inflated back-support 10 according to the Preferred Embodiment of the present invention have become distended outward from the backrest 120 and have adapted to the lumbar-region contour 41 of the occupant 40.

The present invention has been described with reference to a Preferred Embodiment. It should be understood that the embodiment mentioned herein is merely illustrative of the present invention and not intended to be limiting. Numerous variations in construction and use of the present invention may be contemplated in view of the following claims, without straying from the intended scope and field of the invention herein disclosed.

What is claimed is:

1. A back-support device in conjunction with an expansion means arranged within a backrest, said device comprising:

a back-support having a top edge, a bottom edge, a left side and a right side, and a plurality of pleats arranged between said top edge and said bottom edge and said right side and said left side;

wherein said back-support is made of a fabric and has an outer face that faces outward from said backrest and an inner face that faces inward from said backrest toward said expansion means, wherein said plurality of pleats is formed by a series of folds of said fabric so as to form a series of overlapping pleats, said series of folds including alternating outer-face folds and inner-face folds wherein said outerface folds are arranged on said outer face of said back-support and said inner face folds are arranged on said inner face of said back-support, and wherein a line of top-stitching is stitched across each fold in said series of folds, close to an edge of said each fold;

wherein said back-support is attached to said backrest along said right side and said left side and is in communication with said expansion means embedded in said backrest;

and wherein said back-support is expandable in a direction outward from said backrest by means of force applied from said expansion means.

2. The back-support device as described in claim 1, wherein said fabric is from a group consisting of leather, woven cloth, non-woven cloth, natural fiber fabric, and synthetic materials.

3. The back-support device as described in claim 1, wherein each said fold has a first and a second layer and said line of top-stitching passes through said first layer and said second layer.

4. The back-support device as described in claim 1, wherein said backrest has a vertical axis and each fold of said series of folds extends in a direction transverse to said vertical axis.

5. The back-support device as described in claim 1, wherein said backrest has a vertical axis and each fold of said series of folds extends in a direction parallel to said vertical axis.

\* \* \* \* \*